United States Patent
Michi et al.

(10) Patent No.: US 8,036,803 B2
(45) Date of Patent: Oct. 11, 2011

(54) ADAPTIVE CRUISE CONTROL SYSTEM FOR MOTOR VEHICLES

(75) Inventors: Harald Michi, Oelbronn-Duerrn (DE);
 Goetz Braeuchle, Reichartshausen (DE);
 Holger Hofmann, Ravenstein/Ot Merchingen (DE)

(73) Assignee: Robert Bosch GmbH, Stuttgart (DE)

( * ) Notice: Subject to any disclaimer, the term of this patent is extended or adjusted under 35 U.S.C. 154(b) by 1081 days.

(21) Appl. No.: 10/587,986

(22) PCT Filed: Dec. 9, 2004

(86) PCT No.: PCT/EP2004/053366
§ 371 (c)(1),
(2), (4) Date: Jun. 8, 2007

(87) PCT Pub. No.: WO2005/075238
PCT Pub. Date: Aug. 18, 2005

(65) Prior Publication Data
US 2007/0282513 A1 Dec. 6, 2007

(30) Foreign Application Priority Data
Feb. 3, 2004 (DE) .......................... 10 2004 005 229

(51) Int. Cl.
 *B60T 7/12* (2006.01)
(52) U.S. Cl. ................. 701/96; 701/93; 701/97; 701/98
(58) Field of Classification Search .................. None
See application file for complete search history.

(56) References Cited

U.S. PATENT DOCUMENTS

| 6,044,321 | A | 3/2000 | Nakamura et al. |
| 6,418,370 | B1 | 7/2002 | Isogai et al. |
| 6,691,003 | B1* | 2/2004 | Stortz et al. ...................... 701/1 |
| 6,941,215 | B2* | 9/2005 | Hellmann et al. .............. 701/93 |
| 7,292,940 | B2* | 11/2007 | Isogai et al. .................. 701/301 |
| 7,542,839 | B2* | 6/2009 | Wagner et al. .................. 701/93 |
| 2003/0130783 | A1* | 7/2003 | Hellmann et al. .............. 701/93 |

FOREIGN PATENT DOCUMENTS

| CN | 1043465 | 9/1995 |
| DE | 100 15 299 | 10/2001 |
| DE | 102 31 687 | 1/2004 |
| JP | 2002163796 | 6/2002 |
| JP | 2003528763 | 9/2003 |
| WO | WO 2004007231 | 1/2004 |

\* cited by examiner

*Primary Examiner* — Khoi Tran
*Assistant Examiner* — Bhavesh V Amin
(74) *Attorney, Agent, or Firm* — Kenyon & Kenyon LLP

(57) ABSTRACT

Adaptive cruise control (ACC) system for motor vehicles is provided, the ACC system having a sensor system for acquiring data concerning a target object and the own (host) vehicle, an actuator system for controlling the longitudinal movement of the vehicle, and a controller that intervenes in the actuator system within certain intervention limits in order to maintain a defined, controlled target distance from the target object, and an output device for issuing a take-over request to the driver if the controlled target distance cannot be maintained. The ACC system further includes a prediction system for predicting a conflict situation in which the controlled target distance cannot be maintained, in which case the take-over request is initiated before the conflict situation actually occurs.

2 Claims, 1 Drawing Sheet

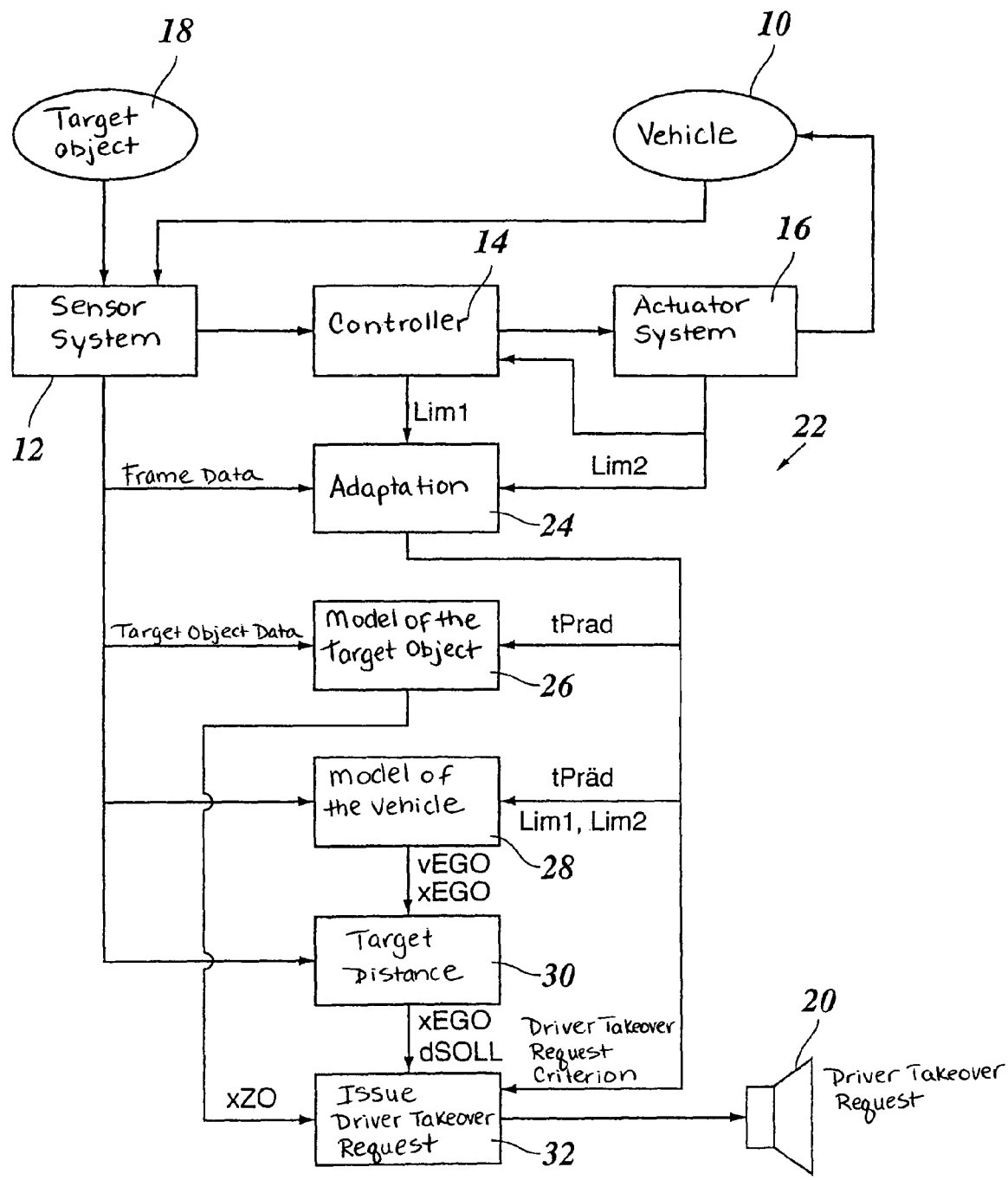

ADAPTIVE CRUISE CONTROL SYSTEM FOR MOTOR VEHICLES

FIELD OF THE INVENTION

The present invention relates to an adaptive cruise control system for motor vehicles, having a sensor system for acquiring data about a target object and about the driver's own vehicle, an actuator system for controlling the longitudinal movement of the vehicle, and a controller that intervenes in the actuator system.

BACKGROUND INFORMATION

In motor vehicles, distance regulation systems, also known as ACC (Adaptive Cruise Control) systems, are increasingly used that automatically regulate the distance of the own vehicle from a vehicle traveling in front of it. The sensor system has, for example, a radar sensor with which the distances and relative speeds, and generally also the directional angles of vehicles traveling in front can be measured. On the basis of the measured directional angle, a decision can be made as to which of the located vehicles is situated in the same lane as the own vehicle, thus representing a relevant target object for the adaptive cruise control. The goal of the control is typically to maintain a defined setpoint distance from this target object, or at least to avoid falling significantly under this setpoint distance. The setpoint distance is usefully speed-dependent, and is generally defined via a setpoint time gap that indicates the time interval in which the two vehicles pass the same point on the roadway. On the basis of the data measured by the radar sensor, the controller calculates for example a positive or negative setpoint acceleration that is required in order to maintain the setpoint distance, and via the actuator system intervenes in the vehicle's drive train, and also in the vehicle's brake system if required, in a manner corresponding to this setpoint acceleration.

In order to achieve a comfortable system behavior and in order to take into account physical properties of the actuator system, as well as safety-related factors, the setpoint acceleration that is finally outputted to the actuator system is limited by an upper and/or lower limit of intervention. However, this limiting can have the consequence that in critical traffic situations the automatic longitudinal speed controlling or longitudinal acceleration controlling of the own (host) vehicle cannot prevent a collision with the vehicle traveling in front. For this reason, an important component of the known ACC systems is an output device via which a take-over request can be issued to the driver in such cases. In this way, the driver is requested to take over the control of the vehicle himself in order to gain control over the critical situation, the driver not being bound to the intervention limits of the control system. For example, in known systems such a take-over request is issued if the controller calculates a setpoint acceleration that would be required in order to maintain the setpoint distance but that lies outside the limits of intervention of the system. In order to gain control over the critical driving situation, the driver is then generally required to respond to the event in a sufficiently rapid and/or energetic, active manner.

SUMMARY

The present invention, has the advantage that the take-over request can be issued further ahead of time, so that the driver has more time for an adequate reaction. In this way, traffic safety is increased and driver comfort is improved, because the changes in acceleration to be brought about by the driver need not be as great. At the same time, in this way stress on the driver is relieved, and the frequency of occurrence of stressful situations is reduced.

According to the present invention, this is achieved by a predictive system that extrapolates the future development of the traffic situation, e.g., the dynamic behavior of the own vehicle and of the target object, so that the takeover request can be issued at a point in time at which a conflict situation requiring driver intervention is foreseeable, but has not yet actually occurred.

As an example, a situation can be considered in which the own (host) vehicle is approaching a slower-moving vehicle in front of it, and the driver of the vehicle in front applies a full braking at a point in time at which the actual distance between the vehicles is still greater than the setpoint distance. The controller of the ACC system will register the change in speed of the vehicle in front, and if necessary will carry out a moderate speed adaptation, but in this case the normal controlling behavior is determined only by the distance and speed data that are present at the current point in time. In general, the controller is not programmed to "foresee" that the driver of the vehicle in front who has applied the full braking will presumably continue the braking process, possibly braking the vehicle to a state at which a correspondingly energetic slowing of the own vehicle is required. With the prediction system according to the present invention, on the other hand, it is possible to predict the anticipated dynamic behavior of the vehicle in front at least approximately, and, based on the result of this prediction, to issue the take-over request, if one is needed, early enough that the driver is given more time to react.

The prediction system determines a fixed or variable prediction time that indicates how far into the future the dynamic data of the vehicles are to be extrapolated. On the basis of a model of the vehicular dynamics of the target object, estimated values or predictive values for the dynamic data of the target object for the time of prediction are then calculated on the basis of the current dynamic data, and additional information if required. These dynamic data can relate to the acceleration, the speed, and the location of the target object. Correspondingly, in a model of the vehicular dynamics of the own vehicle, the dynamic data of the own (host) vehicle for the time of the prediction can be predicted. From the predicted speed of the own (host) vehicle and the setpoint time gap, which can generally be set by the driver within determined limits, the setpoint distance is then calculated for the prediction time. This predicted setpoint distance is then compared with an actual distance predicted on the basis of the dynamic data of the target object, and if these distances meet a determined criterion for the driver takeover request (also called "FÜA" criterion, using German acronym), the takeover request is issued either immediately or with a suitable time delay.

The FÜA criterion is generally created such that the takeover request takes place before the setpoint acceleration calculated by the controller exceeds the intervention limits. If the traffic situation develops in a manner that differs from what was predicted by the prediction system, it may turn out that the situation can be kept under control by the normal control behavior of the controller, requiring no driver intervention. The take-over request is then a preventive measure, serving to increase the driver's attentiveness in critical situations for the sake of safety.

An adaptation module may be provided with which the prediction time can be dynamically varied on the basis of relevant data, for example traffic density, the speed of the own vehicle, and the like. The FÜA criterion can also be dynamically modified in a corresponding manner.

BRIEF DESCRIPTION OF THE DRAWING

FIGURE shows a block diagram of an ACC system according to the present invention.

DETAILED DESCRIPTION

A control system for a motor vehicle 10, called the "own vehicle" (or host vehicle) in the following, has a sensor system 12, a controller 14 formed, for example, by one or more microprocessors, and an actuator system 16 via which the positive or negative acceleration of vehicle 10 is influenced. The sensor system 12 comprises, for example, a radar sensor with which the distance and relative speed of a target object 18, typically a vehicle traveling immediately in front of the own (host) vehicle, are measured. Generally, the radar sensor is also able to detect vehicles in adjoining lanes, as well as vehicles traveling further ahead in the lane of the own vehicle. Moreover, sensor system 12 also includes a number of sensors that provide information about the state of own vehicle 10, e.g., its speed, the currently selected transmission gear, and the like. In addition, additional data of the vehicle can also be acquired, such as the setting options selected by the driver for the setpoint time gap with which target object 18 is to be followed, and, if necessary, the state of loading of the vehicle, the state of the brakes, the roadway skid conditions, and the like. Likewise, sensor system 12 can also acquire environmental data, e.g., weather conditions.

Within the context of normal ACC controlling, sensor system 12 provides information to controller 14 concerning at least the distance and the relative speed of target object 18, as well as the absolute speed of own vehicle 10 and the setpoint time gap that has been set. On the basis of these data, controller 14 first calculates a provisional setpoint acceleration. If this setpoint acceleration is below an upper acceleration limit and above a lower (negative) acceleration limit, it is immediately outputted to actuator system 16 in order to adapt the speed of the vehicle. The upper and lower acceleration limits are determined so as to take into account comfort and safety considerations, and can be modified if necessary by the driver according to his individual comfort preferences. In general, however, these limits, called "soft intervention limits" in the following, are narrower than the limits for the accelerations that can actually be realized by actuator system 16, the drive train and the braking system of vehicle 10. The actual physical limits, which can be dependent on the state of loading of the vehicle, the state of the roadway, and the like, are called "hard intervention limits" in the following.

If the setpoint acceleration calculated by the controller lies outside the hard or soft intervention limits, in particular if the magnitude of the calculated deceleration to be achieved by braking is greater than the allowable or achievable deceleration to be achieved by braking, controller 14 outputs a take-over request FÜA to the driver via an output device 20, for example a loudspeaker. In this case, as a command signal only the relevant boundary acceleration is communicated to actuator system 16.

The ACC system described here additionally has a prediction system 22 with which it is possible under certain conditions to issue the driver take-over request at an earlier point in time. This prediction system has an adaptation module 24, a model 26 of the vehicular dynamics of target object 18, a model 28 of the vehicular dynamics of own vehicle 10, a prediction module 30, and a decision module 32 for issuing the take-over request.

Adaptation module 24 receives from sensor system 12 particular information, called "frame data" that characterizes the current operating conditions, and receives from controller 14 and from actuator 16 signals Lim1, Lim2 that represent the soft and hard intervention limits. On the basis of these data, adaptation module 24 determines a prediction time point tPräd, i.e., a point in time in the future for which the anticipated development of the traffic situation is to be predicted. In addition, adaptation module 24 determines, on the basis of the data available to it, a suitable criterion for the relevant decision in decision module 32 concerning the issuing of the take-over request.

Model 26 for the target object receives from sensor system 12, specifically from the radar sensor, the dynamic data of the target object, i.e., its distance and relative speed, and calculates higher-order time derivatives therefrom if necessary, and predicts, through integration on the basis of suitable modeling assumptions, the anticipated dynamic data of target object 18 (acceleration, speed, and distance) at the prediction time point tPräd.

Correspondingly, on the basis of the dynamic data of the own vehicle, and on the basis of the known control behavior of controller 14 and the intervention limits Lim1, Lim2, model 28 predicts the dynamic data (e.g. acceleration, speed and location) of own vehicle 10 at prediction time point tPräd.

From these dynamic data, e.g., from the predicted speed of the own vehicle vEGO at time tPräd, as well as from additional data provided by sensor system 12, e.g., the setpoint time gap, prediction module 30 calculates a predicted setpoint distance dSOLL for time tPräd. This setpoint distance, as well as the predicted location xEGO of own vehicle 10 and the location xZO of target object 18 predicted by model 26, are used in decision module 32 to calculate the predicted actual distance of target object 18 and to compare this with the predicted setpoint distance dSOLL, in order then to decide on the basis of the decision criterion determined by the adaptation module 24 whether a take-over request FÜA is to be issued.

Prediction time tPräd is varied by adaptation module 24 dependent on the situation. Here, the frame data reported by sensor system 12 and the intervention limits can be taken into account in many ways, as is explained below in relation to some examples. An essential parameter is the current speed of own vehicle 10. While when traveling at high speed, for example on highways, large safety distances are generally maintained, so that short prediction times are acceptable, at medium to low speeds it is advantageous to select a longer prediction time, because here an early take-over request and a correspondingly early reaction of the driver are very important. A highly dynamic traffic situation, characterized for example by frequent or strong changes in speed, also indicates a long prediction time, and the same holds for the traffic density, which can be estimated on the basis of the data of the radar sensor. The setpoint time gap selected by the driver should influence the prediction time in such a way that when the setpoint time gap is short an earlier take-over request takes place. Additional criteria that indicate a long prediction time and that can be acquired by suitable sensors include for example driver attentiveness and degree of stress on the driver. For example, fatigue sensors can recognize signs of tiredness on the part of the driver, so that the prediction time can then be made longer. Signs for increased stress on the driver would for example be circumstances to be expected when the driver is distracted by other tasks, for example a telephone call in progress using a hands-free device or the activity of a navigation system. Likewise, the prediction time can also be influenced by the soft or hard intervention limits. If for example, an icy roadway is recognized with the aid of a slip sensor generally present in the braking system, or in general at temperatures below the freezing point, a longer prediction time will be selected in order to take into account the possibly longer braking distances.

Model 26 for target object 18 can, for example, be fashioned in such a way that it integrates the movement variables of the target object under the assumption of a constant acceleration. It would also be conceivable to assume a constant rate of change of the acceleration or, in general, an nth-order Taylor development of the movement variables, based on the current time derivatives. However, developments are also conceivable that take into account a differentiated evaluation of the traffic situation. For example, here the changes in the state of motion of the vehicle two vehicles ahead, or of vehicles traveling even further in front, reported by the radar system could also be taken into account, as could a slower vehicle recognized as beginning to move from an adjoining lane into the own lane.

Model 28 of the own vehicle is essentially based on an integration of the movement variables, but here the known control behavior of controller 14, and in particular the known intervention limits Lim1, Lim2, are taken into account.

In prediction module 30, in principle the preset setpoint time gap need only be multiplied by the own vehicle speed vEGO predicted by module 28. If necessary, an additional safety distance can be added that is either fixedly predetermined or is dependent on the available frame data.

Because the absolute accelerations of vehicle 10 and of target object 18 are integrated in models 26 and 28, it is useful first to calculate location xEGO of the own vehicle and location xZO of the target object in absolute coordinates, and then to take the difference of the locus coordinates as the predicted actual distance at time point tPräd. The comparison between the predicted setpoint distance and the predicted actual distance in decision module 32 can, for example, take place by calculating the quotient of the predicted actual distance and the predicted setpoint distance. The decision criterion for the take-over request can then be, in the simplest case, a threshold value comparison with a threshold value (<1) determined by adaptation module 24. However, more complex criteria are conceivable, in which additional dynamic variables of the own vehicle and of the target object, provided by models 26 and 28, can also be taken into consideration. Likewise, an algorithm for the FÜA criterion is also conceivable that evaluates the reliability of the prediction and weighs it against the risk potential. Given a lower risk potential of the situation and a lower reliability of the prediction, the issuing of the take-over request can then take place after a short time delay, or can be omitted entirely if the situation becomes less critical on its own.

What is claimed is:

1. An adaptive cruise control system for a host motor vehicle, comprising:
    a sensor system for acquiring data of a present time point regarding a target object and data regarding the host vehicle;
    an actuator system for controlling the longitudinal movement of the host vehicle;
    a controller for intervening in the operation of the actuator system within at least one predetermined intervention range in order to maintain a predetermined controlled target distance of the present time point to the target object;
    an output device for issuing a take-over request to a driver of the host vehicle if the predetermined controlled target distance of the present time point cannot be maintained; and
    a prediction system for predicting a conflict situation in which the predetermined controlled target distance cannot be maintained, the prediction system including:
        an adaptation module configured to calculate a future prediction time point based on the data of the present time point acquired by the sensor system; and
        a vehicular dynamics model of the target object and the host vehicle for calculating, while still at the present time point, predicted values for variables of vehicular dynamics of the host vehicle and the target object for the future prediction time point,
    wherein the prediction system initiates the take-over request to be issued by the output device before the conflict situation occurs, and
    wherein the prediction system calculates from the predicted values an anticipated setpoint distance and an anticipated actual distance between the target object and the host vehicle at the future prediction time point, wherein the prediction system initiates the take-over request to be issued by the output device if the relationship between the anticipated setpoint distance and the anticipated actual distance satisfies a predefined initiation criterion,
    wherein the initiation criterion is a threshold value for the quotient of the anticipated actual distance and the anticipated setpoint distance, and wherein the adaptation module is configured to dynamically vary the future prediction time point, dependent on data provided by the sensor system.

2. The adaptive cruise control system as recited in claim 1, wherein the adaptation module is configured to dynamically vary the initiation criterion for the take-over request, dependent on data provided by the sensor system.

* * * * *